United States Patent [19]

Willis

[11] Patent Number: 4,636,861
[45] Date of Patent: Jan. 13, 1987

[54] TWO-LOOP LINE DEFLECTION SYSTEM

[75] Inventor: Donald H. Willis, Indianapolis, Ind.

[73] Assignee: RCA Corporation, Princeton, N.J.

[21] Appl. No.: 718,300

[22] Filed: Apr. 1, 1985

[51] Int. Cl.⁴ ............................................. H04N 5/04
[52] U.S. Cl. ..................................... 358/158; 358/150
[58] Field of Search ............... 358/148, 150, 158, 159; 331/20; 315/387, 389

[56] References Cited

U.S. PATENT DOCUMENTS

| | | | |
|---|---|---|---|
| 4,292,654 | 9/1981 | Steckler et al. | 358/158 |
| 4,317,133 | 2/1982 | Fernsler et al. | 358/158 |
| 4,327,376 | 4/1982 | Balaban et al. | 358/159 |
| 4,351,001 | 9/1982 | McGinn et al. | 358/158 |
| 4,467,359 | 8/1984 | Hosoya | 358/159 |
| 4,476,490 | 10/1984 | Kaneko | 358/148 |
| 4,591,910 | 5/1986 | Lai et al. | 358/158 |

FOREIGN PATENT DOCUMENTS 58-154970  9/1983  Japan .

OTHER PUBLICATIONS

Development Sample Data Sheet for MAA 2500 (DPU), pp. 109–127, of Digit 2000 VLSI Digital TV System, edition 1983/9.

Primary Examiner—Jin F. Ng
Attorney, Agent, or Firm—Eugene M. Whitacre; Joseph J. Laks; Sammy S. Henig

[57] ABSTRACT

In a synchronized digital horizontal deflection system operating at $2 \times f_H$, a digital phase-lock-loop circuit generates first $f_H$ rate signal that is synchronized to the horizontal sync pulses, and a second $f_H$ rate second signal that is delayed from the first signal by one-half of the period H. A digital phase-control-loop circuit receives the first and second signals and generates a horizontal deflection control signal at $2 \times f_H$ rate that controls the retrace interval timing in a deflection circuit output stage. The synchronization of every other retrace interval occur in accordance with information provided by the first signal.

16 Claims, 5 Drawing Figures

SYNC PHASE COMPARATOR 22 OF Fig. 2

TWO-LOOP LINE DEFLECTION SYSTEM

The invention relates to a circuit that generates a train of higher frequency pulses synchronized to input synchronization pulses, such as may be used in a television apparatus.

Recently there has been an interest in displaying an interlaced type video signal such as of the NTSC standard, in a non-interlaced scanning format for reducing the effects of artifacts. Such displaying format generally requires deflection current switching at a frequency which is a multiple of the horizontal frequency, $f_H$, of the horizontal sync pulses. In television systems using double-horizontal rate scanning format, for example, it may be required to generate two cycles of horizontal deflection current from each horizontal sync pulse. In comparison, in standard television systems, the correspondence is one cycle from each sync pulse.

In some prior art circuits, the doubling of the horizontal rate frequency is accomplished by a phase-lock-loop circuit that includes a voltage controlled oscillator (VCO). The output frequency of the VCO is equal to a multiple of the horizontal rate. In digital television, for example, it is desirable to generate the deflection current using signals that are derived from a common system clock, rather than from a VCO.

In an apparatus embodying an aspect of the invention, a phase-lock-loop circuit responsive to a periodic line synchronizing input signal is used for generating, at the same relative times, respectively, to the input signal, and in each period of the input signal, synchronized first and second periodic signals respectively.

In accordance with an aspect of the invention, a phase control-loop circuit is responsive to a deflection cycle indicative signal of a deflection circuit and to at least one of said first and second periodic signals for generating first and second deflection output signals each period of the line synchronizing input signal. An output stage of the deflection circuit is used for generating a cycle of deflection current upon the occurrence of each one of the first and second deflection output signals.

In carrying out a specific embodiment of the invention, for example, the circuit doubles the frequency of the sync pulses to obtain, in the output stage, deflection current at the frequency of $2 \times f_H$.

The timings of each of the first and second periodic signals is defined with a resolution of a fraction of a common clock signal period. Each period of the synchronizing input signal results in a corresponding sequence of states in the phase-lock-loop circuit. Each state is produced synchronously with the common clock signal. The phase-lock-loop circuit supplies the first and second periodic signals that are indicative of a first and second periodic events, respectively, to a phase-control-loop circuit for generating the first and second deflection output signals, respectively, therefrom.

In accordance with another aspect of the invention, the phase-control-loop circuit receives a retrace signal from the deflection circuit output stage for correcting, illustratively, only once during a given period of the synchronizing input signal, and in accordance with the timings of one signal of the first and second signals, the timings of the output signals. The output signals timings are corrected, so as to make the timings of alternate deflection cycles correspond with the first and second periodic events, respectively.

In accordance with yet another aspect of the invention, the tracking response time, in the phase-control-loop circuit, with respect to phase variations of the retrace signal is faster than the corresponding tracking response, in the phase-lock-loop circuit, with respect to phase variations of the synchronizing input signal that contains the sync pulses. This is so, because the phase-control-loop circuit is optimized to accommodate fast switching time variations in the output stage that may occur because of fast changing electron beam current; whereas the phase-lock-loop circuit is optimized to reject noise or jitter accompanying the sync pulses.

Figure 1:
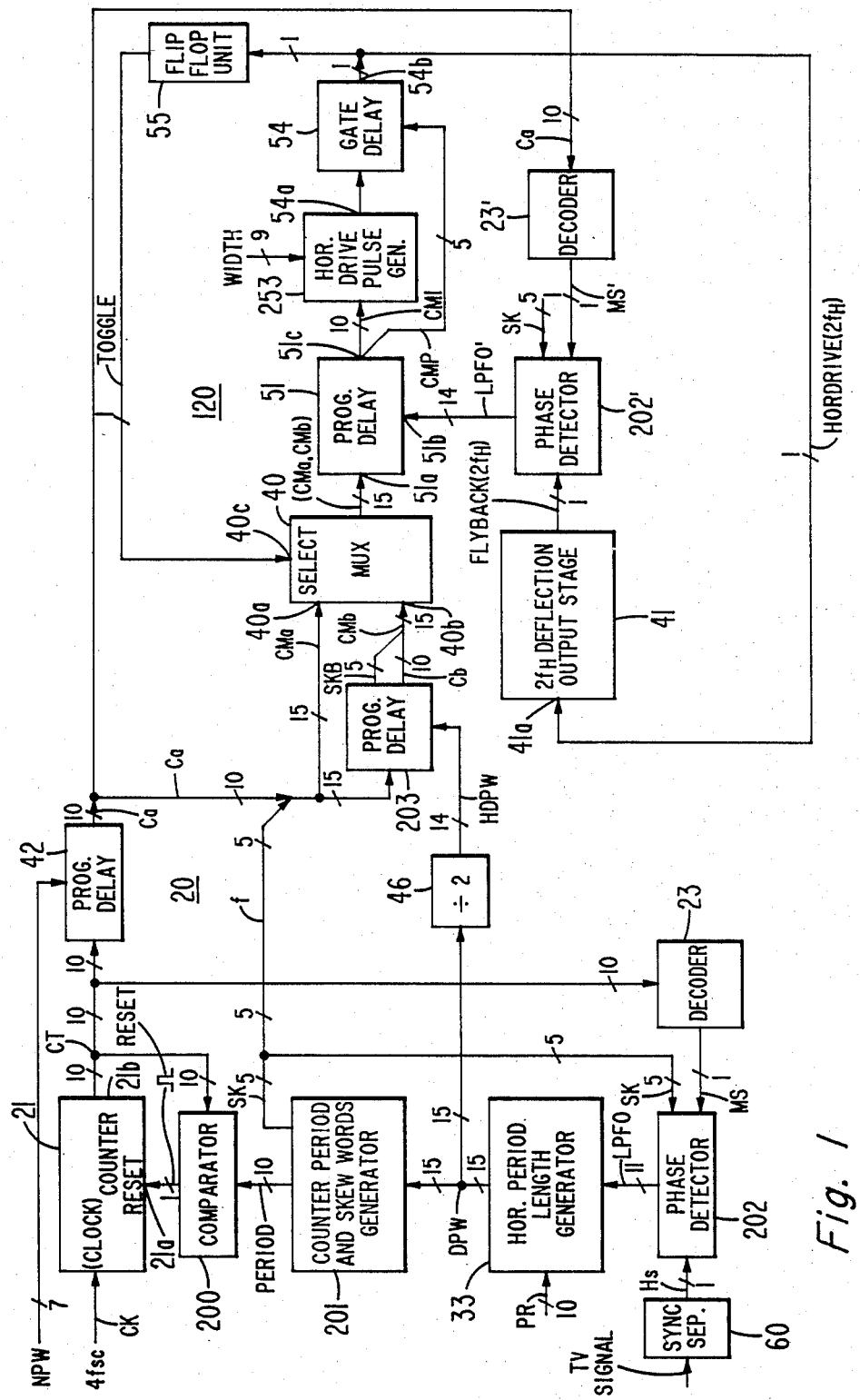
FIG. 1 illustrates a general block diagram of a deflection circuit that includes a phase-lock-loop circuit and a phase-control-loop circuit, embodying an aspect of the invention.

FIG. 1 illustrates a block diagram of a horizontal deflection circuit including a phase-lock-loop circuit 20. It includes a sequential counter 21 that has the analogous function of a VCO of a conventional phase-lock-loop circuit. Counter 21 is a programmable counter that is incremented after each leading edge of a clock CK having a period $t_{CK}$, illustrated in the timing diagram of FIG. 4a. It counts up, from an initial value of, for example, 1, until it is reset to the initial value by a reset pulse RESET at an input terminal 21a of FIG. 1. Pulse RESET controls the number of clock CK periods $t_{CK}$ that are included in a corresponding period, or sequence, N, of counter 21. Successions of sequences N produced by counter 21 define a recurring sequence. Each word CT, at an output port 21b of counter 21, supplies, in a given sequence N, the current count of counter 21.

Illustratively, a digital word herein is represented as a base 2 number that includes an integer, a fraction or a combination of an integer and a fraction. A negative number is represented as a 2's complement number.

Horizontal sync pulses $H_s$ having a period H (1H sync pulses $H_s$), are coupled, illustratively, from a conventional sync separator 60 of a television receiver to a phase detector 202. When phase-lock-loop circuit 20 is phase-locked to sync pulses $H_s$, provided that they are accompanied by low level of noise, the leading edge of each pulse MS that is coupled to phase detector 202 occurs substantially coincidentally with the last clock CK edge that occurs before the center of the corresponding sync pulse $H_s$. Pulse MS is generated by a decoder 23 when a predetermined value of word CT is detected. Thus, the center of each sync pulse $H_s$ occurs a variable fraction f of clock CK period $t_{CK}$ of FIG. 4a after the leading edge of pulse MS of FIG. 1.

Variable fraction f is contained in a 1H skew work SK that is also coupled to phase detector 202. Phase detector 202 generates a period length adjusting word LPFO. Word LPFO is combined, in a horizontal period length generator 33, with a constant word PR to produce a word DPW. Word PR, for example, equals the value 910 where 910×$t_{CK}$ is equal to the nominal, or free-running period, of phase-lock-loop circuit 20. Note that clock CK period $t_{CK}$ is equal to 1/4×$f_{sc}$ where $f_{sc}$ is the NTSC color subcarrier frequency.

Word DPW contains the calculated estimate, or computed, binary value of the actual period H of pulses $H_s$ in the form of an integer number M of clock CK period $t_{CK}$ and a fractional number k of clock CK period $t_{CK}$. Word DPW is coupled to a counter period and skew words generator 201 that generates 1H skew word SK and a period word PERIOD. Word PERIOD, that contains the number of clock CK cycles in a given counter 21 period N, is coupled to a comparator 200 that compares the current value of words CT and PERIOD and generates pulse RESET when word CT=word PERIOD. Pulse RESET initializes counter 21 to contain word CT=1 simultaneously with the next clock CK edge that, thereby, defines the end time of the current sequence N of counter 21 and the beginning time of the next sequence N.

Words CT are coupled through a programmable time shifter or delay 42 to provide delayed words Ca. The delay of programmable delay 42 is controlled by an external word NPW that is coupled from a source not shown in the FIGURES. A word CMa, defined to include words SK and Ca that provide the fraction and integer parts, respectively, of word CMa, is coupled to a programmable delay 203. A word CMao is defined as the state of word CMa in which word Ca=0. Word CMao defines a periodic event $e_{CMao}$ having a period that is equal to an estimated value of the actual period H, in accordance with word DPW. Event $e_{CMao}$ occurs f×$t_{CK}$ after the leading edge of clock CK that causes word Ca to become zero, as described later on. Fraction f is the value contained in 1H skew word SK.

Horizontal period length word DPW is coupled to a divide-by-2 unit 46 that divides the value of word DPW by the factor 2 to produce word HDPW that is indicative of one-half the horizontal period length H. Word HDPW is coupled to the control port of programmable delay 203 that delays event $e_{CMao}$, defined by word CMao, by H/2 in accordance with the value of delay 203 control word HDPW.

A word CMb, the output word of programmable delay 203 includes a skew word SKB and a word Cb, providing the fraction and integer parts, respectively, of word CMb. A word CMbo is defined as the state of word CMb in which word Cb=0. Word CMbo defines a periodic event $e_{CMbo}$ that occurs in the calculated estimate center of the interval between each pair of successive events $e_{CMao}$.

Words CMa and CMb are coupled to ports 40a and 40b, respectively of a multiplexer 40. Multiplexer 40 couples, alternately, words CMa and CMb to input port 51a of a programmable time shifter or delay 51 of a phase-control-loop circuit 120. Words CMI and CMP, at an output port 51c of programmable delay 51, represent an integer and a fraction, respectively, of clock CK period $t_{CK}$ of FIG. 4a. Words CMI are coupled to a horizontal drive pulse generator 253 that generates, each time word CMI=0, a pulse PGP having a width w that is controlled by an external word WIDTH. Pulse PGP is coupled from pulse generator 253 to an input terminal 54a of a gate delay 54. Gate delay 54 delays pulse PGP by a fraction q of clock CK period $t_{CK}$ of FIG. 4a, having a length that is determined in accordance with the value of word CMP of FIG. 1, to produce a $2f_H$ rate signal HORDRIVE at an output terminal 54b of gate delay 54. Signal HORDRIVE is also coupled to a flip-flop unit 55. Each pulse of signal HORDRIVE causes the toggling of a signal TOGGLE at an output terminal 55a of flip-flop unit 55. Signal TOGGLE is coupled to a select terminal 40c of multiplexer 40. Signal TOGGLE causes, in accordance with its logical state, the alternate coupling of words CMa and CMb, respectively, to input port 51a of programmable delay 51. Thus, the timings of the pulses of signal HORDRIVE are controlled, alternately, by the words in ports 40a and 40b, respectively, of multiplexer 40.

It should be understood that an arrangement similar to the arrangement of FIG. 1 may be used for generating a signal analogous to signal HORDRIVE of FIG. 1 having a different multiple of the frequency $f_H$ such as, illustratively, $3f_H$ or $4f_H$.

Signal HORDRIVE is coupled to an input terminal 41a of a $2f_H$ horizontal deflection circuit output stage 41 to control the switching of a horizontal output transistor that generates a current in a deflection winding, not shown in the FIGURES, of output stage 41, defining deflection cycles at the $2f_H$ rate. A retrace interval is formed in response to a corresponding pulse of signal HORDRIVE. A resulting deflection cycle indicative pulse FLYBACK, occurring during retrace, that is obtained, illustratively, from a flyback transformer, not shown in FIG. 1, of output stage 41, is coupled to a phase detector 202'.

When phase-control-loop circuit 120 is perfectly phase-locked to flyback pulses FLYBACK, the leading edge of each pulse MS', that is also coupled to phase detector 202', occurs substantially coincidentally with the last clock CK edge before the center time of the respective pulse FLYBACK. Pulse MS' is generated by a decoder 23' when a predetermined value of word Ca is detected. The center of pulse FLYBACK occurs fraction f of clock CK period $t_{CK}$ of FIG. 4a after the leading edge of pulse MS' of FIG. 1. Fraction f is contained in 1H skew word SK.

Phase detector 202' generates a word LPFO' that controls the delay time of programmable delay 51. Programmable delay 51 is capable of providing a positive or negative phase shift, or time delay, as explained later on. The center of $2f_H$ rate pulses FLYBACK occurs coincidentally with each corresponding event $e_{CMao}$ or $e_{CMbo}$. Event $e_{CMao}$ occurs during the time in which word Ca=0; whereas event $e_{CMbo}$ occurs when word Cb=0, as described before. Therefore, the arrangement of FIG. 1 generates the $2f_H$ rate pulses FLYBACK, corresponding constant delay times relative to the corresponding 1H sync pulse $H_s$.

Figure 2:
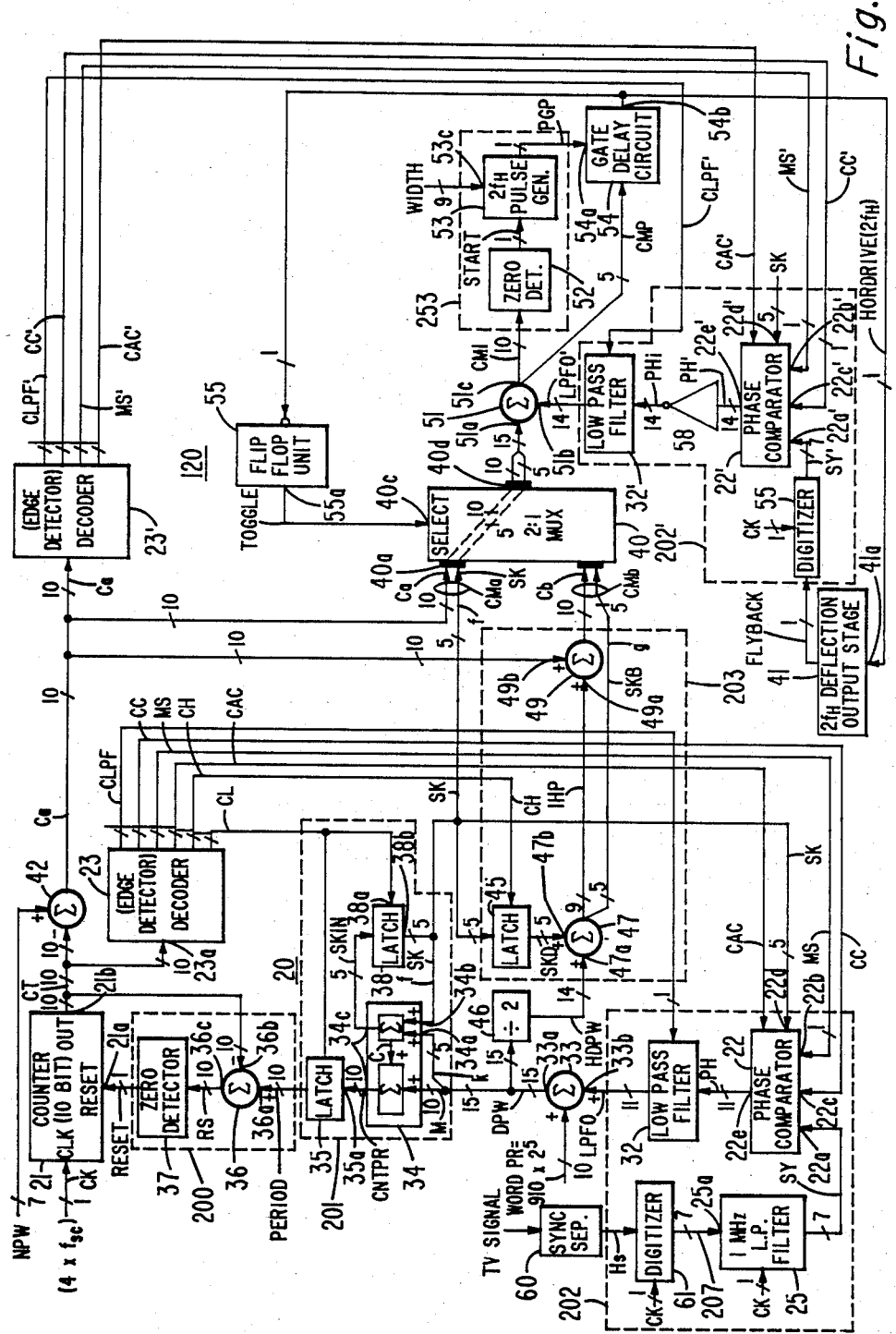
FIG. 2 illustrates a detailed block diagram of the deflection circuit of FIG. 1.
Figure 4:
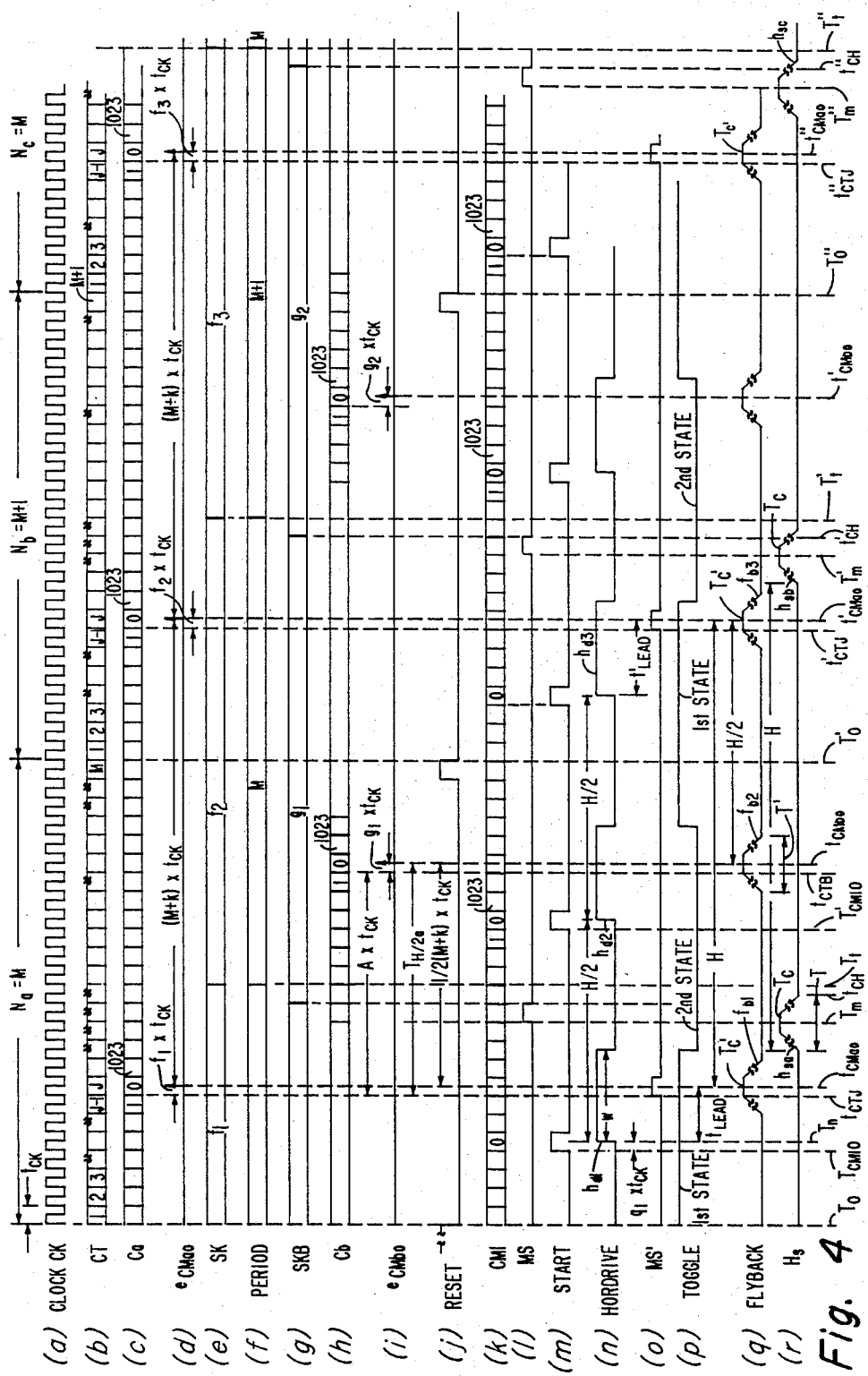
FIGS. 4a–4r illustrate timing diagrams that are useful for explaining the operation of the circuit of FIG. 2.

FIG. 2 illustrates a more detailed block diagram of the arrangement of FIG. 1. Similar numerals and symbols in FIGS. 1 and 2 illustrate similar items or functions. FIGS. 4a–4r illustrate timing diagrams of a typical steady state example, showing three consecutive periods, or sequences, $N_a$, $N_b$ and $N_c$ of counter 21 of FIG. 2, when phase-lock-loop circuit 20 is phase-locked to sync pulses $H_s$ of FIG. 4r. Similar numbers and symbols in FIGS. 1, 2 and 4a–4r represent similar items or functions.

Assume that word DPW, at an input port 34a of an adder 34 of FIG. 2, contains the calculated estimate value of period H of horizontal sync pulses $H_s$ of FIG. 4r. Word DPW of FIG. 2 includes, illustratively, 10-bit number, M, representative of an integer multiple of clock CK periods $t_{CK}$ of FIG. 4a, and 5-bit number, k, representative of a fraction of period $t_{CK}$. The value $(M+k) \times t_{CK}$ defines the updated estimate of period H.

Skew word SK, representing fraction f, at an output port 38b of a latch 38 of FIG. 2, is coupled, right justified, to an input port 34b of adder 34, where it is summed up with right justified word DPW. A word CNTPR appears at an output port 34c of adder 34 to represent the integer part of the addition result. Each bit of word CNTPR is at the same numerical weight as the corresponding bit of the integer part, M, of word DPW. Word CNTPR is coupled to an input port 35a of a latch 35. Latch 35 stores the value of word CNTPR, at a time $T_t$ of FIG. 4f under the control of a pulse CL of decoder 23 of FIG. 2, to form period length word PERIOD at an input port 36a of a subtractor 36. Subtractor 36 controls the total number of states in a given counter 21 period N. Decoder 23 decodes counter 21 words CT and generates timing control signals such as pulse CL, as well as other timing pulses that are mentioned later on, when a corresponding predetermined state of counter 21 occurs. Pulse CL is also coupled to a clock input terminal 38a of latch 38 for storing, at time $T_t$ of FIG. 4e, a word SKIN of FIG. 2 to produce 1H skew word SK that contains fraction f. The bits of fraction f appear at the same numerical scale, or weight, as the corresponding bits of fraction k of word DPW. Fraction f is representative of the fractional part of the addition result. Thus, adder 34 adds right justified latch 38 output word SK, that was formed by pulse CL during the immediately preceding period N of counter 21, to right justified word DPW, for updating words PERIOD and SK, respectively, at time $T_t$ of FIGS. 4f and 4e, respectively.

Counter 21 output word CT of FIG. 2 is coupled to an input port 36b of subtractor 36 where it is subtracted from word PERIOD to form, in a port 36c, a word RS. Word RS is coupled to a zero detector 37. Zero detector 37 issues pulse RESET, as illustrated in FIG. 4j, when word RS of FIG. 2 is equal to zero. Thus, when counter 21 word CT is equal to counter 21 period word PERIOD, counter 21 is reset and the next counter 21 word CT is equal to 1, the initial counting state. Word PERIOD expresses, in multiples of clock CK periods $t_{CK}$ of FIG. 4a, the length of period N of counter 21 of FIG. 2.

Word Ca, illustratively 10-bit wide, is obtained by subtracting, in a subtractor that represents programmable delay 42 of FIG. 1, the current word CT of counter 21 of FIG. 2 from constant word NPW. FIG. 4c illustrates an example of the corresponding sequence that is represented by words Ca. When word CT is equal to word NPW, word Ca is equal to 0. Similarly, when word CT exceeds word NPW by 1, word Ca is equal to 1023, in accordance with conventional 2's complement arithmetic. In each counter 21 sequence N, the states Ca=1, Ca=0 and Ca=1023 occur, respectively, as counter 21 of FIG. 2 is incremented sequentially. The time in which word Ca of FIG. 4c becomes zero is defined as time $t_{CTJ}$. Time $t_{CTJ}$ occurs (J−1) clock CK periods $t_{CK}$ after sequence N beginning time, such as time $T_0$ of period $N_a$. During clock Ck period $t_{CK}$ that follows time $T_0$, counter 21 word CT is equal to 1. Word CMao is defined as the state of word CMa in which Ca=0, as described before. Each word CMao thus defines periodic event $e_{CMao}$ that occurs at time $t_{CMao} = t_{CTJ} + f \times t_{CK}$, as illustrated by the corresponding short arrows in FIG. 4d. Note that word SK of a given word CMao may have different values in corresponding counter 21 periods N. For example, during the interval $t_{CK}$ that immediately follows time $t_{CTJ}$ of FIG. 4e, word SK is equal to $f_1$. Thus, event $e_{CMao}$ of FIG. 4d occurs at time $t_{CMao} = t_{CTJ} + f_1 \times t_{CK}$. Note that fraction $f_1$ was computed during period N of counter 21 of FIG. 2, not shown in FIGS. 4a–4r, that occurred immediately prior to period $N_a$.

The arrangement of FIG. 2 computes the timing of the next event $e_{CMao}$ of FIG. 4d, such as time $t_{CMao}'$ of event $e_{CMao}'$ relative to time $t_{CTJ}$, by adding, in adder 34, old fraction $f_1$ of word SK of FIG. 2, to fraction k of word DPW to produce new fraction $f_2$. A binary carry C may be produced from such addition and the corresponding new period word PERIOD becomes (M+the value of carry C), at time $T_t$ of FIG. 4f. The interval between successive events $e_{CMao}$ of FIG. 4d is equal to $(M+k) \times t_{CK}$, as shown by the examples below.

Assume, hypothetically, that prior to time $T_t$ of FIG. 4e the fractional result, word SKIN of FIG. 2=$(f_1+k)$, is <1; since no carry C is produced, word CNTPR is equal to M, the integer part of word DPW. After pulse CL of FIG. 2 occurs, at time $T_t$ of FIG. 4e, word SK is equal to $f_2 = (f_1+k)$ and word PERIOD of FIG. 4f is equal to M. Since reset pulse RESET of FIG. 4j occurs when word CT of FIG. 2 is equal to word PERIOD, the length of counter 21 period $N_a$ is going to be equal to (M) clock CK periods $t_{CK}$ of FIG. 4a. The corresponding event $e_{CMao}$ that occurs at time $t_{CMao}$ of FIG. 4d during counter 21 period $N_a$, occurs $(J-1+f_1) \times t_{CK}$ after beginning time $T_0$ of period $N_a$ of FIG. 4b.

Assume, in a second hypothetical example, that prior to time $T_t'$ of FIG. 4e, the fractional result, word SKIN of FIG. 2=$f_2+k$, is >1; consequently, carry C is produced in adder 34, and word CNTPR of is equal to (M+1). It follows that after pulse CL occurs, at time $T_t'$ of FIG. 4e, fraction $f_3$, represented by word SK of FIG. 4e, is equal to $(f_1+k)+k-1$, and word PERIOD of FIG. 4f is equal to (M+1). Therefore, the length of counter 21 period $N_b$ of FIG. 4b is going to be equal to (M+1) clock CK periods $t_{CK}$. The corresponding event $e_{CMao}'$, during counter 21 period $N_b$, occurs $(J-1+f_1+k) \times t_{CK}$ after beginning time $T_0'$ of period $N_b$ of FIG. 4b.

Assume, in a third hypothetical example, that prior to time $T_t''$, the fractional result, word SKIN of FIG. 2=$(f_1+2k-1)+k$, is <1; since no carry C is produced, word CNTPR is equal to M. It follows that after pulse CL occurs, at time $T_t''$ of FIG. 4e, the corresponding word PERIOD of FIG. 4f is equal to M. Therefore, the length of counter 21 period $N_c$ of FIG. 4b is going to be equal to (M) clock CK periods $t_{CK}$. The corresponding event $e_{CMao}''$ occurs $(J-1+f_1+2k-1) \times t_{CK}$ after beginning time $T_0''$ of period $N_c$ of FIG. 4b.

The above calculations lead to the conclusion that the interval $t'_{CMao} - t_{CMao}$ of FIG. 4d, of successive events $e_{CMao}$, is equal to:

$$[T_0' - t_{CMao}] + [t_{CMao'} - T_0'] = [M - (J-1+f_1)] + [J-1+f_1+k] = (M+k)$$

of clock CK periods $t_{ck}$. Likewise, the interval $t''_{CMao} - t'_{CMao}$ is equal to:

$$[T_0'' - t_{CMao}'] + [t_{CMao''} - T_0''] = [(M+1) - (J-1+f_1+k)] + [J-1+f_1+2k-1] = (M+k)$$

of clock CK periods $t_{ck}$. Thus, the length of the interval between successive events $e_{CMao}$ of FIG. 4d, is expressed in the content, (M+k), of word DPW of FIG. 2. The length of a given period N of FIG. 4b may be, for example, either (M) or (M+1) clock CK periods $t_{CK}$; however, the average length of period N, is equal to period H of horizontal sync pulses $H_s$ of FIG. 4r, as explained later on.

At time $t_{CH}$ of FIG. 4g, which occurs prior to time $T_t$ of period $N_a$, fraction f in latch 38 of FIG. 2 is saved in a latch 45 to form a word SKD. The saving of word SK is done by a pulse CH from decoder 23. Word SKD is coupled, right adjusted, to an input port 47b of an adder 47 that is similar to adder 34. Word DPW, that contains (M+k), is coupled through divide-by-2 unit 46 that includes, for example, a right shifter, to the other input port of adder 47 to form there right adjusted word HDPW that is equal to $(\frac{1}{2}) \times (M+k)$. A word IHP, the integer part of the result of the addition in adder 47, is coupled to an input port 49a of an adder 49. Word Ca of programmable delay 42 is coupled to an input port 49b of adder 49 where it is added with word IHP to form word Cb. Skew word SKB of FIGS. 4g and 2 contains a fractional part g of the result of the addition of the respective fractions in adder 47.

Word Cb is equal to 0 during the length of clock CK period $t_{CK}$ that immediately follows clock CK edge of a time $t_{CTB}$ of FIG. 4h. Word CMbo of FIG. 2 that is defined as the state of word CMb in which word Cb=0, is thus defined in an analogous manner to the way word CMao was defined before. Similarly to words CMao, words CMbo define corresponding periodic events $e_{CMbo}$ of FIG. 4i, that are analogous to events $e_{CMao}$ of FIG. 4d. In an analogous manner, event $e_{CMbo}$ of FIG. 4i, for example, occurs $g \times t_{CK}$ after time $t_{CTB}$ of FIG. 4h.

As explained before, programmable delay 203 of FIG. 1, that is controlled by word HDPW, delays the occurrence of event $e_{CMao}$ of FIG. 4d by a duration that is determined in accordance with the value of word HDPW of FIG. 2 to define event $e_{CMbo}$ of FIG. 4i. Event $e_{CMbo}$ is delayed by H/2 relative to the corresponding event $e_{CMao}$ of FIG. 4d. Each event $e_{CMbo}$ of FIG. 4i occurs at the center of the corresponding interval that lies between consecutive events $e_{CMao}$ of FIG. 4d, as shown by the example below.

During counter 21 period $N_a$ of FIG. 4g, prior to time $t_{CH}$, latch 45 of FIG. 2 contains fraction $f_1$. Since word HDPW is equal to $(\frac{1}{2}) \times (M+k)$, the addition result at port 47c of adder 47 is equal to $(\frac{1}{2}) \times (M+k)+f_1$. Assume, hypothetically, that M is an odd number that is equal to 2A+1. The number A, an integer, is thus equal to (M−1)/2. It follows that $(\frac{1}{2}) \times (M+k)+f_1$ is equal to $(A+\frac{1}{2}+k/2+f_1)$. Further assume, hypothetically, that fraction $g_1$ of word SKB of FIG. 4g, that is equal to $(\frac{1}{2}+k/2+f_1)$, is less than 1. Thus word IHP is equal to A, the integer part of word HDPW. Because of the summation of words IHP and Ca in adder 49, word Cb of FIG. 4h will be equal to zero when (A) clock CK periods $t_{CK}$ have elapsed after time $t_{CTJ}$ of FIG. 4c. Thus, event $e_{CMbo}$ of FIG. 4i of time $t_{CMbo}$ occurs $(A) \times t_{CK}+(\frac{1}{2}+k/2+f_1) \times t_{CK}$ after time $t_{CTJ}$ of FIG. 4c. The total delay time, $T_{H/2a}$ in FIG. 4i, from time $t_{CTJ}$ to the corresponding time $t_{CMbo}$ is equal to $$\left[\frac{M-1}{2} + (\frac{1}{2} + k/2 + f_1)\right] \times t_{CK} = \left(\frac{M+k}{2} + f_1\right) \times t_{CK}.$$

Since event $e_{CMao}$ occurs at time $t_{CMao} = t_{CTJ} + f_1 \times t_{CK}$, it follows that event $e_{CMbo}$ of FIG. 4i occurs $(M+k)/2 \times t_{CK}$ after the immediately preceding event $e_{CMao}$ of FIG. 4d. It can be shown that the same result is obtained when other assumptions are made with respect to M or fraction $g_1$. Since the period defined by successive events $e_{CMao}$ is equal to (M+k), it follows that each event $e_{CMbo}$ of FIG. 4i lies at the center of the interval $t_{CMao} - t_{CMao}'$ between consecutive events $e_{CMao}$ and $e_{CMao}'$, respectively, of FIG. 4d. As described later on, and in accordance with an aspect of the invention, alternate retrace intervals, that are repeated every period H, occur in accordance with times $t_{CMbo}$ of events $e_{CMbo}$ of FIG. 4i. The other alternate retrace intervals occur in accordance with times $t_{CMao}$ of events $e_{CMao}$ of FIG. 4d.

Each $f_H$ rate sync pulse $H_s$ of FIG. 2 is sampled by clock CK and the corresponding sample is digitized in a digitizer unit 61, such as an analog-to-digital converter, to form, in a conventional manner, a corresponding word 207. Successive digitized sync words 207 are coupled to an input port 25a of a digital low pass filter 25. Successive digitized sync words SY, at the output of filter 25 are coupled to an input port 22a of a sync phase comparator 22. As described below, sync words SY are used for synchronizing each event $e_{CMao}$ of FIG. 4d with the corresponding sync pulse $H_s$ of FIG. 4r, and for obtaining period length word DPW of FIG. 2.

Figure 3:
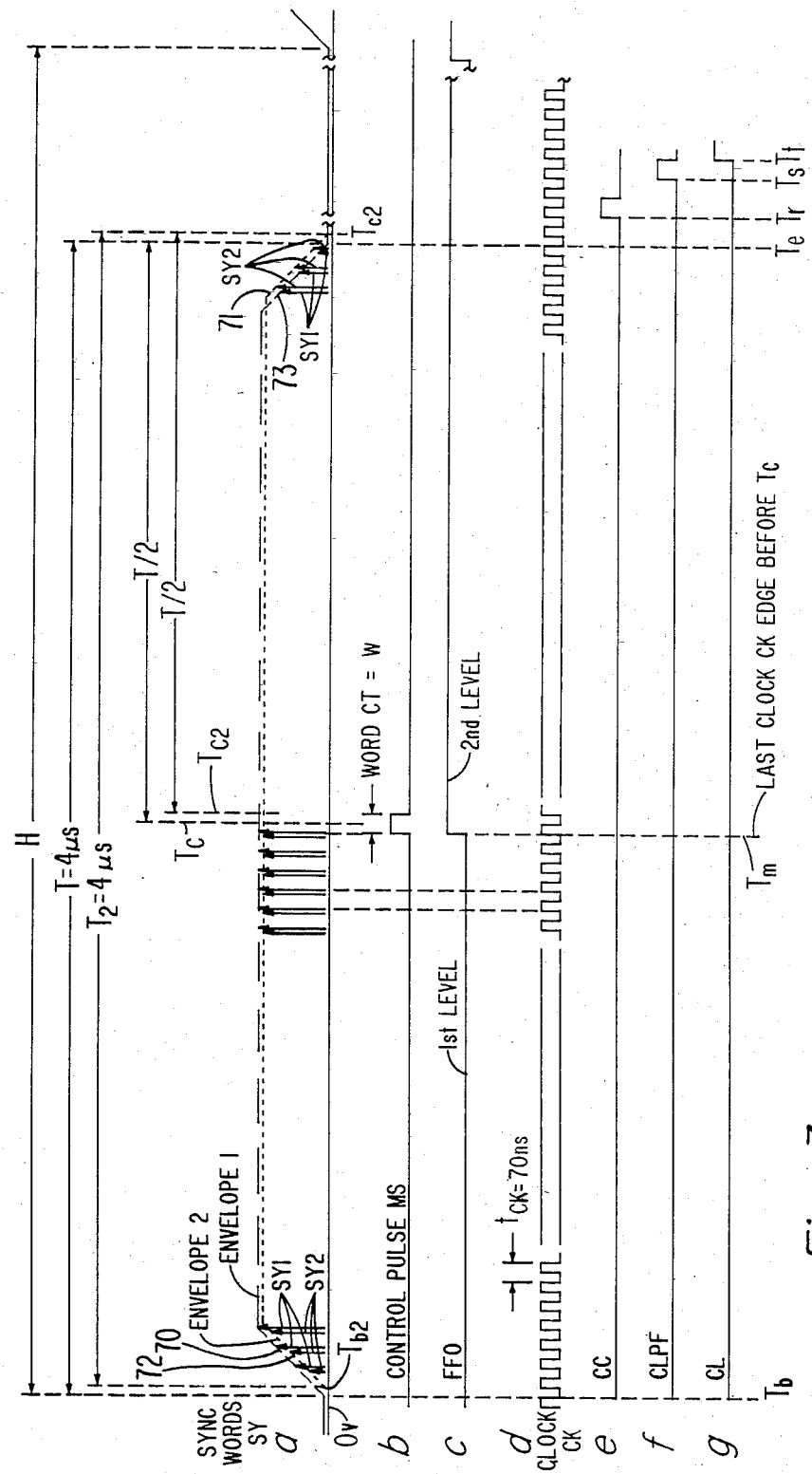
FIGS. 3a–3g illustrate timing diagrams useful in explaining the synchronization of the phase-lock-loop circuit of FIG. 2.

FIGS. 3a–3g illustrate schematically timing diagrams useful in explaining the synchronization of phase-lock-loop circuit 20 of FIG. 2. Similar symbols and numerals in FIGS. 2, 3a–3g, and 4a–4r illustrate similar items or functions. FIG. 3a illustrates an example of successive digitized sync words SY of FIG. 2 that result from digitizing an idealized trapezoidal horizontal sync pulse $H_s$, defining a trapezoidal envelope 1, during interval T of FIGS. 4r and 3a. Envelope 1 of FIG. 3a has a leading edge 72 and a trailing edge 73, illustrated by dashed lines. During entire interval T, between times $T_b$ and $T_e$, respectively, each sync word SY appears after each leading edge of clock CK of FIG. 3d. Words SY are illustrated schematically by the vertical arrows that reach up to envelope 1, representing the respective magnitude of words SY.

Decoder 23 of FIG. 2 produces control pulse MS at time $T_m$ of FIG. 3c or 4l when a predetermined value of word CT of FIG. 2 occurs, such as, for example when word CT is equal to 315. Control pulse MS is coupled to a terminal 22b of phase comparator 22 where it is phase-compared with a corresponding sync pulse $H_s$ that forms words SY, as described below.

Figure 5:
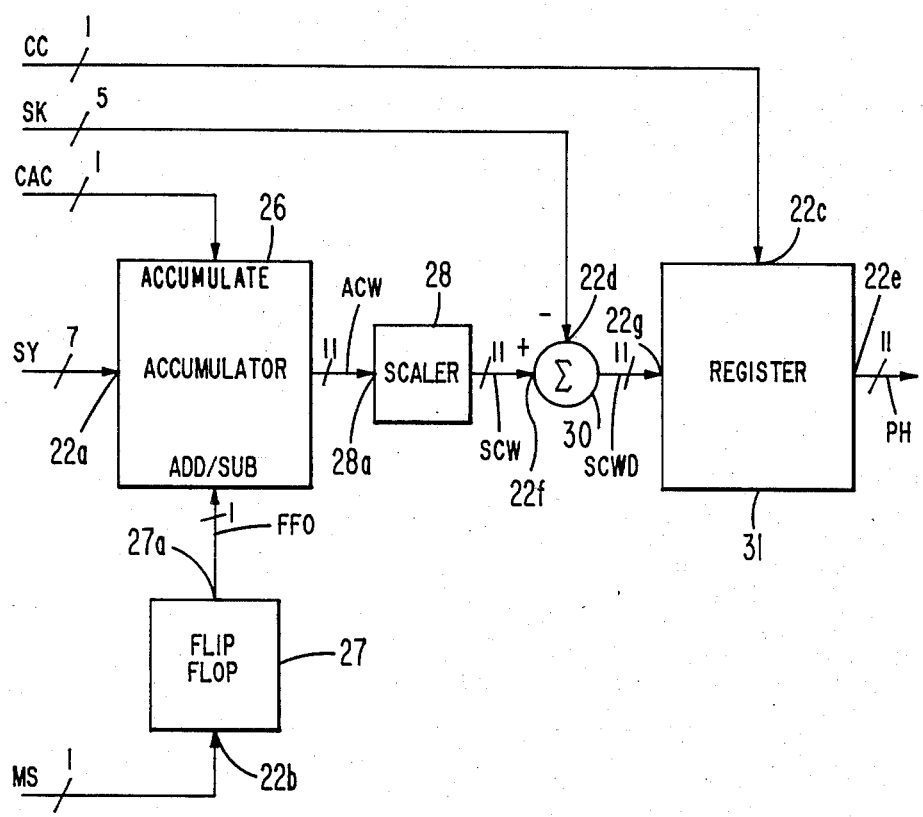
FIG. 5 illustrates an embodiment of a phase comparator of FIG. 2.

FIG. 5 illustrates schematically a block diagram of phase comparator 22. Similar symbols and numerals in FIGS. 1, 2, 3a–3g, 4a–4r and 5 indicate similar items or functions. Phase comparator 22 of FIG. 5 includes an accumulator 26 that substractively accumulates, from an initial value of zero, successive sync words SY of FIG. 3a from time $T_b$, at the beginning of interval T of FIG. 3a, as controlled by a signal CAC of decoder 23 of FIG. 2, through time $T_m$ of FIG. 3a. At time $T_m$ associated with pulse MS of FIG. 5, a signal FFO at an output terminal 27a of a flip-flop 27, toggles from a first logical level to a second logical level, as illustrated in FIG. 3c. Flip-flop 27 signal FFO of FIG. 5 toggles after receiving, at a clock input terminal 22b, the leading edge of control pulse MS. After time $T_m$, and until interval T end time $T_e$ of FIG. 3a, as controlled by signal CAC, individual sync words SY are additively accumulated in accumulator 26 to provide an output word ACW that contains the total accumulation of the substractions and the subsequent additions.

In a second timing example of FIG. 3a, sync words SY, referred to as sync words SY2, are illustrated schematically by vertical arrows that define an envelope 2. Envelope 2, that is illustrated by the dotted lines, has a leading edge 70 and a trailing edge 71, that are similar to the respective edges in envelope 1. Words SY2 are provided within an interval $T_2$ that is equal in length to interval T. A center point $T_{c2}$ of interval $T_2$ is delayed relative to center point $T_c$ of interval T. Note that each word SY2 is of a smaller value at leading edge 70 but of a larger value at trailing edge 71 of envelope 2 than the corresponding words SY1 of leading edge 72 and trailing edge 73, respectively, of envelope 1. Therefore, the sum total in word ACW, at an end time $T_{e2}$ of period $T_2$, is more positive than at end of time $T_e$ of period T. Thus, the magnitude of word ACW is proportional to the length of the corresponding interval $T_{c2}-T_m$ or $T_c-T_m$. It follows that the magnitude and polarity values of word ACW correspond with the time difference, $(T_c-T_m)$, between actual center point $T_c$ of interval T and time $T_m$ that is defined by the leading edge of pulse MS of FIG. 3b.

Output word ACW of accumulator 26 of FIG. 5 is coupled to an input port 28a of a scaler 28. Scaler 28 generates from word ACW a word SCW that expresses the time difference, $(T_c-T_m)$ of FIG. 3a as a ratio n that is equal, illustratively, to $(T_c-T_m)/t_{CK}$. Ratio n has a resolution of time difference $(T_c-T_m)$, illustratively, of 1/32 of clock CK period $t_{CK}$.

Word SK of FIG. 2, that contains fraction f, is coupled to a port 22d of subtractor 30 of FIG. 5 where it is subtracted from word SCW to form a word SCWD at an input port 22g of a register 31. Register 31 stores each word SCWD and transfers it to an output port 22e to provide a phase word PH of FIG. 5. Phase word PH, that is, consequently, equal to $[(T_c-T_m)/t_{CK}-f]$, is clocked into and out of register 31 by a pulse CC of decoder 23 of FIG. 2 that is coupled to a clock terminal 22c at instant $T_r$ of FIG. 3e following end time $T_e$ of period T of FIG. 3a.

A time $T_{cc}=T_m+f\times t_{CK}$, as described later on, represents the calculated, or expected, occurrence time of the center of period T of FIG. 3a. The interval between time $T_{cc}$ and the corresponding time $t_{CMao}$ of event $e_{CMao}$ is inherently equal to a predetermined integer multiple of clock CK periods $t_{CK}$ of FIG. 3d. It follows that time $T_{cc}$ is also periodic with the same period length of $(M+k)\times t_{CK}$ as time $t_{CMao}$ of event $e_{CMao}$ of FIG. 4d. Thus, in order to synchronize the occurrences of events $e_{CMao}$ to the corresponding sync pulses $H_s$ of FIG. 4r, it is sufficient that the actual center point $T_c$ of period T of FIG. 3a coincides with the calculated time $T_{cc}$. Word PH of FIG. 2 that is equal to $[(T_c-T_m)/t_{CK}-f]$, is thus indicative of the time difference between the actual center point $T_c$, and the calculated center point $T_{cc}$ of interval T of FIG. 3a. When word PH of FIG. 2 is positive, the actual center time $T_c$ of FIG. 3a is greater, or later, than the calculated center time $T_{cc}$. Conversely, when word PH of FIG. 2 is negative, the actual center time $T_c$ of FIG. 3a is smaller, or earlier, than the calculated center time $T_{cc}$. When time $T_{cc}$ is equal to time $T_c$, phase word PH of FIG. 2 is zero.

Phase word PH is coupled through a conventionally built digital low pass filter 32 of FIG. 2 to an input port 33b of an adder 33 to form filter 32 output word LPFO.

Filter 32 may comprise an accumulator that additively accumulates individual phase words PH, under the control of a horizontal rate pulse CLPF generated by decoder 23 at a corresponding time $T_s$ of FIG. 3f. Time $T_s$ appears after time $T_r$ of pulse cc of FIG. 3e. When phase word PH of FIG. 2 is zero, in the steady state example, word LPFO of low pass filter 32 does not change. A negative phase word PH, for example, decreases the value of word LPFO; whereas a positive phase word PH increases it. The adder of generator 33 adds word PR that represents the nominal number of clock CK periods $t_{CK}$ contained in a given period H of the NTSC composite television signal, to the integer part of word LPFO for forming deflection period word DPW at port 33a. As described before, period length word DPW is added with 1H skew word SK to produce updated words PERIOD and SK when pulse CL occurs at time $T_t$ of FIG. 3g. Time $T_t$ occurs shortly after time $T_s$ of FIG. 3f.

Assume, hypothetically, that actual center time $T_c$ of FIG. 3a is later than calculated center time $T_{cc}$; consequently, phase word PH of FIG. 2 is of a positive value. Word DPW becomes larger when phase word PH becomes more positive. In the subsequent interval T of FIG. 3a, the larger word DPW produces calculated center time $T_{cc}$, representing a longer time interval from the previous time $T_{cc}$. Thus calculated center time $T_{cc}$ becomes closer to actual center time $T_c$ for achieving synchronization. In a steady, or synchronized, state, clock CK edge of FIG. 3d at time $T_m$, occurs a fraction of clock CK period $t_{CK}$, that is equal to f, prior to actual center point $T_c$ of interval T of FIG. 3a. In the steady, or synchronized, state, each of events $e_{CMao}$ and $e_{CMbo}$ of FIGS. 4d and 4i, respectively, that are associated with words CMa and CMb, respectively, of FIG. 2, occurs a corresponding constant delay time, respectively, from the corresponding horizontal sync pulses $H_s$ of FIG. 4r.

When output signal TOGGLE, of flip-flop unit 55 at select terminal 40c of multiplexer 40 of FIG. 2, is at the first logical state, words CMa in port 40a are coupled right adjusted to port 51a of programmable delay 51 that comprises an adder. Phase shifting word LPFO' of phase-control-loop circuit 120 is coupled, right adjusted, to port 51b of the adder of programmable delay 51. Word CMI at output port 51c of adder, or delay, 51, representing the integer part of the result of the addition in programmable delay 51, as illustrated schematically in FIG. 4k, is coupled to a zero detector 52. Zero detector 52 generates a pulse START at time $T_{CMIO}$ of FIG. 4m, when word CMI of FIG. 4k becomes zero. Pulse START of FIG. 2 is coupled to pulse generator unit 53 causing it to generate, in a conventional manner, pulse PGP having a width w that is controlled by external controlling word WIDTH. Word WIDTH is coupled to an input port 53c of pulse generator 53. Pulse PGP is coupled to gate delay 54 that delays each individual pulse PGP by a fraction q of clock CK period $t_{CK}$, thus producing a corresponding individual pulse $h_d$ component of signal HORDRIVE of FIG. 4n. Fraction q of word CMP at output port 51c of adder 51 of FIG. 2 represents the fractional part of the result of the summation at the adder of programmable delay 51. The width w of pulse $h_{d1}$ of FIG. 4h is, illustratively, wide enough to overlap the corresponding width of pulse $f_{b1}$ of FIG. 4q.

Gate delay 54 may include a delay line of $t_{CK}$ time delay, having, for example, 32 uniformly distributed taps. A given 5-bit combination of word CMP of FIG. 2 may select a corresponding tap of the 32 taps for delaying pulse PGP a fraction of clock CK period $t_{CK}$ in accordance with its numerical value. For example, when fraction q of word CMP is equal to $(00101)_2$, the delay obtained is equal to $(5/32) \times t_{CK}$. Thus, an individual component pulse $h_{d1}$ of signal HORDRIVE of FIG. 4n occurs, for example, at time $(T_{CMIO} + q_1 \times t_{CK})$, where $q_1$ is the fraction contained in word CMP of FIG. 2.

After, for example, the occurrence of the trailing edge of pulse $h_{d1}$ component of signal HORDRIVE of FIG. 4n, signal TOGGLE changes its state to be at a second state, as illustrated in FIG. 4p. Now signal TOGGLE causes words CMb in port 40b of multiplexer 40 of FIG. 2 to be coupled to port 51a of programmable delay 51 in the form of words CMI and CMP at its output port 51c. Zero detector 52 now generates pulse START at time $T_{CMIO}'$ of FIG. 4m, when word CMI of FIG. 4k at port 51c of programmable delay 51 of FIG. 2, becomes zero. This is done in a similar manner that was described before with respect to time $T_{CMIO}$. Time $T_{CMIO}'$ of FIG. 4m is thus determined now by words Cb of FIG. 4h. The ensuing trailing edge of pulse $h_{d2}$ component of signal HORDRIVE of FIG. 4n will cause flip-flop unit 55 of FIG. 2 to revert back to the first state, as illustrated in FIG. 4p, for coupling, as explained before, words Ca and SK of each word CMa at port 40a to port 51a of programmable delay 51 of FIG. 2. Thus, in accordance with an aspect of the invention, the timings of alternate first and second component pulses $h_d$ of signal HORDRIVE of FIG. 4n that generates corresponding cycles of the deflection current that forms line deflection cycles at the $2f_H$ rate and that may be provided on the same signal line, such as, for example, at terminal 41a, of FIG. 2, are controlled, alternately, by words CMa and CMb in ports 40a and 40b, respectively, of multiplexer 40.

Each pulse FLYBACK of output stage 41 having illustratively, a trapezoidal shape, as illustrated in FIG. 4q, and derived from horizontal flyback pulses, may be digitized in a digitizer unit 61', that is analogous to digitizer unit 61, to form successive digitized flyback words SY' at an input port 22a' of a phase comparator 22'. Flyback words SY' of phase-control-loop circuit 120 are analogous to sync words SY of phase-lock-loop circuit 20. Phase comparator 22' may be constructed similarly to phase comparator 22 of phase-lock-loop circuit 20. Thus, ports 22a'-22e' of phase comparator 22' respectively, are functionally equivalent to ports 22a-22e, respectively, of phase comparator 22. A decoder 23' decodes corresponding predetermined values of words Ca for generating pulses MS' CAC', CC' and CLPF', respectively, that are analogous to pulses MS, CAC, CC and CLPF, respectively, of decoder 23. Pulse CC', for example, is coupled to terminal 22c'. Skew word SK is similarly coupled to port 22d' of phase comparator 22'.

Assume that flyback words SY', representing a trapezoidal envelope that is similar to envelope 1 of sync words SY of FIG. 3a, for example, are consecutively generated during a retrace interval T' of FIG. 4q that has an actual center time $T_c'$. Interval T' and center time $T_c'$ are analogous to interval T and center point $T_c$ of FIG. 3a, respectively. In the example of FIG. 4q, the leading edge of pulse MS' of FIG. 2, that is coupled to terminal 22b' of phase comparator 22', occurs at time $t_{CTJ}$ of FIG. 4d as illustrated in FIG. 4o. In an analogous manner to the operation of phase comparator 22, a phase word PH' at port 22e' of phase comparator 22' of FIG. 2 is indicative of the corresponding time difference $(T_c' - t_{CMao})$. The term $t_{CMao}$ in phase word PH', is analogous to the term $T_{cc}$ in phase word PH of phase comparator 22. Using the same analogy, it follows that when center point $T_c'$ of interval T' of an individual pulse $f_{b1}$ of pulses FLYBACK of FIG. 4q is greater than the corresponding time $t_{CMao}$ of FIG. 4d, phase word PH' of FIG. 2 is positive. On the other hand, when time $T_c'$ of FIG. 4q is equal to time $t_{CMao}$, phase word PH' of FIG. 2 is zero.

Phase word PH' of FIG. 2 is coupled to a sign complementing unit 58 that provides a sign complemented word PHi. When word PH' is negative, for example, word PHi is positive and of, illustratively, the same absolute value as word PH'. Words PHi are coupled to a low pass digital filter 32' that is analogous to filter 32 of phase-lock-loop circuit 20. Filter 32' output word LPFO' has a shorter response time to phase variations of pulses FLYBACK of FIG. 4q than the response time of low pass filter 32 to phase variations of pulses $H_s$ of FIG. 4r. In the steady state of phase-control-loop circuit 120 of FIG. 2, occurring when phase word PH' is zero, word LPFO' is negative with such a value that causes center point $T_c'$, of alternate flyback pulses $f_{b1}$ and $f_{b3}$ pulses FLYBACK of FIG. 4q, to occur at times $t_{CMao}$ and, $t_{CMao}$, respectively, of FIG. 4d. It can be shown that component pulse $h_{d1}$, for example, of signal HORDRIVE of FIG. 4n, occurs prior to the corresponding time $t_{CMao}$ of FIG. 4d by a period $t_{LEAD}$ that is equal to $(Q+h) \times t_{CK}$, where Q and h are the integer and fractional parts respectively, of word LPFO' of FIG. 2.

Word NPW of FIG. 2, that is coupled to the adder of programmable delay 42, controls the relative timing between pulse MS' of decoder 23' and the corresponding pulse MS of decoder 23. By changing the value of word NPW a corresponding change of the duration between, for example, center times $T_c'$ and $T_c$ of pulses $f_{b1}$ and $H_{sa}$ of FIGS. 4q and 4r, respectively, is obtained.

As a result of a beam current change in the picture tube, the ultor current changes. The ultor current change that is coupled to the flyback transformer of output stage 41 causes the delay between pulse $f_{b1}$ of FIG. 4q and pulse $h_{d1}$ of FIG. 4n also to change because of switching time change. Assume that as a result of such change in delay, the interval $(T_c' - t_{CMao})$ of pulse $f_{b1}$ of FIG. 4q deviates from zero and becomes positive. In this case, word PH' of FIG. 1 becomes more positive and word LPFO' becomes more negative. Therefore, the next pulse $h_{d3}$ of FIG. 4n occurs earlier, causing pulse $f_{b3}$ of pulses FLYBACK of FIG. 4q to occur earlier. This leads to a decrease in the length of the subsequent interval $(T_c' - t_{CMao}')$ so as to correct for the assumed deviation caused by the corresponding beam current change.

In accordance with an aspect of the invention, the same value of word LPFO' of FIG. 2 controls the timings of successive pulses $h_d$ of FIG. 4n that correspond with events $e_{CMao}$ and $e_{CMbo}$, respectively. Because, for example, time $t_{CMbo}$ of FIG. 4i is spaced from time $t_{CMao}$ of FIG. 4d by a period length of H/2, as shown in FIG. 4q and as described before, pulse $f_{b2}$ of flyback pulses FLYBACK of FIG. 4q that corresponds with time $t_{CMbo}$ of FIG. 4i, appears H/2 after the immediately preceding pulse $f_{b1}$ of pulses FLYBACK of FIG. 4q. Pulse $f_{b1}$ corresponds with time $t_{CMao}$ of FIG. 4d. Thus, updating low pass filter 32' by pulse CLPF' of FIG. 2 occurs once in each horizontal period H. It should be understood that decoder 23' may be designed so that updating low pass filter 32' occurs at a rate of, illustratively, $2f_H$ that corresponds with the rate of flyback pulses FLYBACK of FIG. 2q.

When sync pulses $H_s$ of FIG. 2 are absent, causing word LPFO of filter 32 to be zero, word DPW, which is equal to word PR=910, causes the arrangement of FIG. 1 to form retrace intervals separated by $910/2 \times t_{CK}$, that is equal to ½ the nominal value of period H in an NTSC system.

What is claimed:

1. An apparatus for generating in a given period of a line synchronizing input signal, first and second component signals of a deflection output signal of a line deflection circuit that control the timings of corresponding deflection cycles thereof, such that the frequency of said deflection cycles is higher than that of said input signal, said apparatus comprising:
   a phase-lock-loop circuit responsive to said line synchronizing input signal for generating, in said given period thereof, first and second periodic signals separated by corresponding intervals from said input signal;
   a phase-control-loop circuit responsive to said first and second periodic signals for generating from said first periodic signal said first component signal and for generating from said second periodic signal said second component signal of said deflection output signal during said given period of said line synchronizing input signal, and including a phase detector that is responsive to a deflection cycle indicative signal and to at least one of said first and second periodic signals to control the timings of said first and second component signals; and
   a line output stage of said line deflection circuit responsive to said output signal for generating a given cycle of said deflection cycles upon the occurrence of each one of said first and second component signals of said deflection output signal such that the frequency of said deflection cycles is higher than that of said input signal, said output stage developing said deflection cycle indicative signal at a frequency that is related to that of said deflection cycles to provide phase information of said deflection cycles.

2. An apparatus as recited in claim 1 wherein said phase detector is responsive only to the deflection cycle indicative signal associated with only one of said first and second component signals of said deflection output signal.

3. An apparatus as recited in claim 1 wherein said phase detector is responsive to only one of said first and second periodic signals for phase shifting the timings of both of said first and second component signals of said deflection output signal in accordance with said one periodic signal.

4. An apparatus as recited in claim 1 wherein both said first and second component signals of said deflection output signal are provided on the said signal line.

5. An apparatus as recited in claim 1 further comprising means for combining said first and second periodic signals to form a third periodic signal that has a constant phase relationship with, and a frequency greater than, said input signal, wherein said third periodic signal is coupled to said phase-control-loop circuit that generates said deflection cycles at the frequency that is higher than that of each of one said first and second periodic signals.

6. An apparatus as recited in claim 5 wherein the frequency of said third periodic signal is an integer multiple of that of said input signal.

7. An apparatus as recited in claim 5 wherein said combining means comprises a multiplexer that alternately couples said first and second periodic signals to form said third periodic signal.

8. An apparatus as recited in claim 5 further comprising a source of a clock signal, wherein said third periodic signal forming means forms integer and fraction part signals of said third periodic signal that supply timing information thereof, wherein said integer part signal is indicative of a corresponding cycle of said clock signal and wherein said fraction part signal is indicative of a corresponding fraction of a cycle of said clock signal, and means responsive to said integer and fraction part signals of said third periodic signal for generating said first and second component signals of said deflection output signal in accordance with timing information contained therein.

9. An apparatus as recited in claim 5 wherein said third periodic signal is coupled to a time shifting means of said phase-control-loop circuit that time shifts said third periodic signal in accordance with said at least one of said first and second periodic signals for generating a time shifted third periodic signal therefrom, and wherein said phase-control-loop circuit generates said deflection output signal from said time shifted third periodic signal.

10. An apparatus according to claim 1 wherein each of said first and second periodic signals is separated by a corresponding constant interval from said input signal.

11. An apparatus according to claim 1 wherein said phase-lock-loop circuit generates said first and second periodic signals on different signal lines, respectively.

12. A deflection apparatus responsive to a line synchronizing input signal for generating a deflection output signal that forms corresponding deflection cycles in a deflection circuit during a given period of said input signal such that the frequency of said deflection cycles is higher than that of said input signal, said apparatus comprising:
   a phase-lock-loop circuit responsive to said line synchronizing input signal for generating in said given period thereof a periodic signal at a frequency that is related to the frequency of said input signal;
   a line output stage of said line deflection circuit responsive to said output signal for generating said higher frequency deflection cycles and for developing a deflection cycle indicative signal at said higher frequency that contains phase information of said higher frequency deflection cycles; and
   a phase-control-loop having a phase detector that generates a control signal in accordance with said higher frequency deflection cycle indicative signal and in accordance with said periodic signal, said phase-control-loop being responsive to said periodic signal for generating said output signal that forms said deflection cycles at the frequency that is higher than that of said input signal and in a phase that is determined in accordance with said control signal of said phase detector.

13. An apparatus according to claim 12 wherein said phase detector is responsive to said deflection cycle indicative signal during only alternate periods of said deflection cycles.

14. An apparatus according to claim 12 wherein said phase-control-loop comprises a source of a clock signal and means responsive to said periodic signal and to said clock signal for generating a first signal that is synchronized to said clock signal and a skew providing second signal that is indicative of a fraction of the period of said clock signal such that both said first and second signals define a second periodic signal that is at a frequency that is higher than that of said input signal and that is used for generating said output signal.

15. An apparatus according to claim 14 wherein said phase-control-loop further comprises means for generating a third signal at an instant that is synchronized to said clock signal and a delay means responsive to said second signal for delaying said third signal by an amount that is determined in accordance with said second signal such that the delayed third signal is at a frequency that is higher than that of said input signal.

16. An apparatus according to claim 12 wherein said phase-lock-loop circuit is responsive to a periodic clock signal for generating in a given period of said periodic signal a periodic skew signal at a frequency that is higher than that of said input signal that is indicative of a fraction of the period of said clock signal and wherein said phase detector of said phase-control-loop is responsive to said skew signal that supplies phase information to said phase detector.

* * * * *